United States Patent
Ebejer et al.

(10) Patent No.: US 10,553,891 B2
(45) Date of Patent: Feb. 4, 2020

(54) SELF-MAINTAINED FLOW CELL DEVICE

(71) Applicant: International Business Machines Corporation, Armonk, NY (US)

(72) Inventors: Neil Ebejer, Kilchberg (CH); Patrick Ruch, Jenins (CH)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/440,125

(22) Filed: Feb. 23, 2017

(65) Prior Publication Data
US 2018/0241064 A1    Aug. 23, 2018

(51) Int. Cl.
H01M 8/18        (2006.01)
H01M 8/0247    (2016.01)
H01M 8/2465    (2016.01)
H01M 8/2455    (2016.01)

(52) U.S. Cl.
CPC ............ H01M 8/2465 (2013.01); H01M 8/18 (2013.01); H01M 8/2455 (2013.01); Y02E 60/528 (2013.01)

(58) Field of Classification Search
CPC ...... H01M 8/0247; H01M 8/188; H01M 8/18; H01M 8/2455; H01M 8/2465; Y02E 60/528
See application file for complete search history.

(56) References Cited

U.S. PATENT DOCUMENTS 7,591,947 B2    9/2009   Caze et al.
8,906,578 B2   12/2014   Krings et al.
2007/0048587 A1*  3/2007   Yagi ................. H01M 8/0267
                                                          429/457
2009/0291344 A1* 11/2009   Tanaka .............. H01M 8/0228
                                                          429/460
2014/0011115 A1    1/2014   Vincent et al.
2015/0221959 A1*   8/2015   Jin ..................... H01M 8/0258
                                                          429/418
2016/0079624 A1    3/2016   Brantley et al.

OTHER PUBLICATIONS

Seemann et al., "Wetting morphologies at microstructured surfaces", PNAS, Proceedings of the National Academy of Sciences of the United States of America, Feb. 8, 2005, vol. 102, No. 6, pp. 1848-1852.
List of IBM Patents or Patent Applications Treated as Related.

\* cited by examiner

*Primary Examiner* — Lingwen R Zeng
(74) *Attorney, Agent, or Firm* — Scully, Scott, Murphy & Presser, P.C.; Daniel Morris, Esq.

(57) ABSTRACT

The present invention is notably directed to a flow cell device. The device comprises: an exchange membrane, extending essentially in a plane; an adhesive, at a periphery of the membrane; and two half-cells, each on a respective side of said plane, the half-cells sandwiching the membrane. The membrane spans a smaller area than each of the areas of the half-cells, whereby a peripheral space is defined at the periphery of the membrane between two opposing faces of the half-cells. This space is at least partly filled with an adhesive, so as to secure the two half-cells to each other with the membrane encapsulated therein. The present invention is further directed to a method of fabrication of such a flow cell device.

13 Claims, 3 Drawing Sheets

SELF-MAINTAINED FLOW CELL DEVICE

BACKGROUND

The invention relates in general to the field of flow cell devices, and in particular to micro redox flow cells.

Chemical flow reactors in general, and redox flow cells in particular, are used for various applications, which notably include the synthesis of fine chemicals, water treatment or energy storage.

Such devices are typically deployed at large scale, e.g., occupying a volume of 0.1 to 100 m$^3$. However, as it can be realized, it would be advantageous to deploy such devices at smaller scales, e.g., with volumes between 0.1 to 100 mm$^3$, for other applications, such as microreactors, high-throughput screening, clinical diagnostics, or portable power sources and energy storage.

There are, to the knowledge of the inventors, no such devices available that would provide similar functionality as the known, large-scale devices.

SUMMARY

According to a first aspect, the present invention is embodied as a flow cell device. The device comprises: an exchange membrane, extending essentially in a plane; an adhesive, at a periphery of the membrane; and two half-cells, each on a respective side of said plane, the half-cells sandwiching the membrane. The membrane spans a smaller area than each of the areas of the half-cells, whereby a peripheral space is defined at the periphery of the membrane between two opposing faces of the half-cells. This space is at least partly filled with an adhesive, so as to secure the two half-cells to each other with the membrane encapsulated therein.

According to another aspect, the invention is embodied as a method of fabrication of a flow cell device according to embodiments. The method comprises: inserting the membrane between the two half-cells and positioning the latter so as to define a peripheral space (around the membrane); and filling an adhesive into said peripheral space, so as to secure the two half-cells to each other with the membrane encapsulated therein.

Devices and fabrication methods embodying the present invention will now be described, by way of non-limiting examples, and in reference to the accompanying drawings.

BRIEF DESCRIPTION OF SEVERAL VIEWS OF THE DRAWINGS

FIG. 5 shows the device, once assembled. FIG. 4 depicts a similar view, wherein the upper half-cell is not depicted, to unveil the peripheral adhesive. For comparison purposes, FIG. 3 shows the same device (without the adhesive), while the membrane is hidden in FIG. 2, to reveal the channel flow structures and pinning structures of the lower half-cell.

Figure 1:
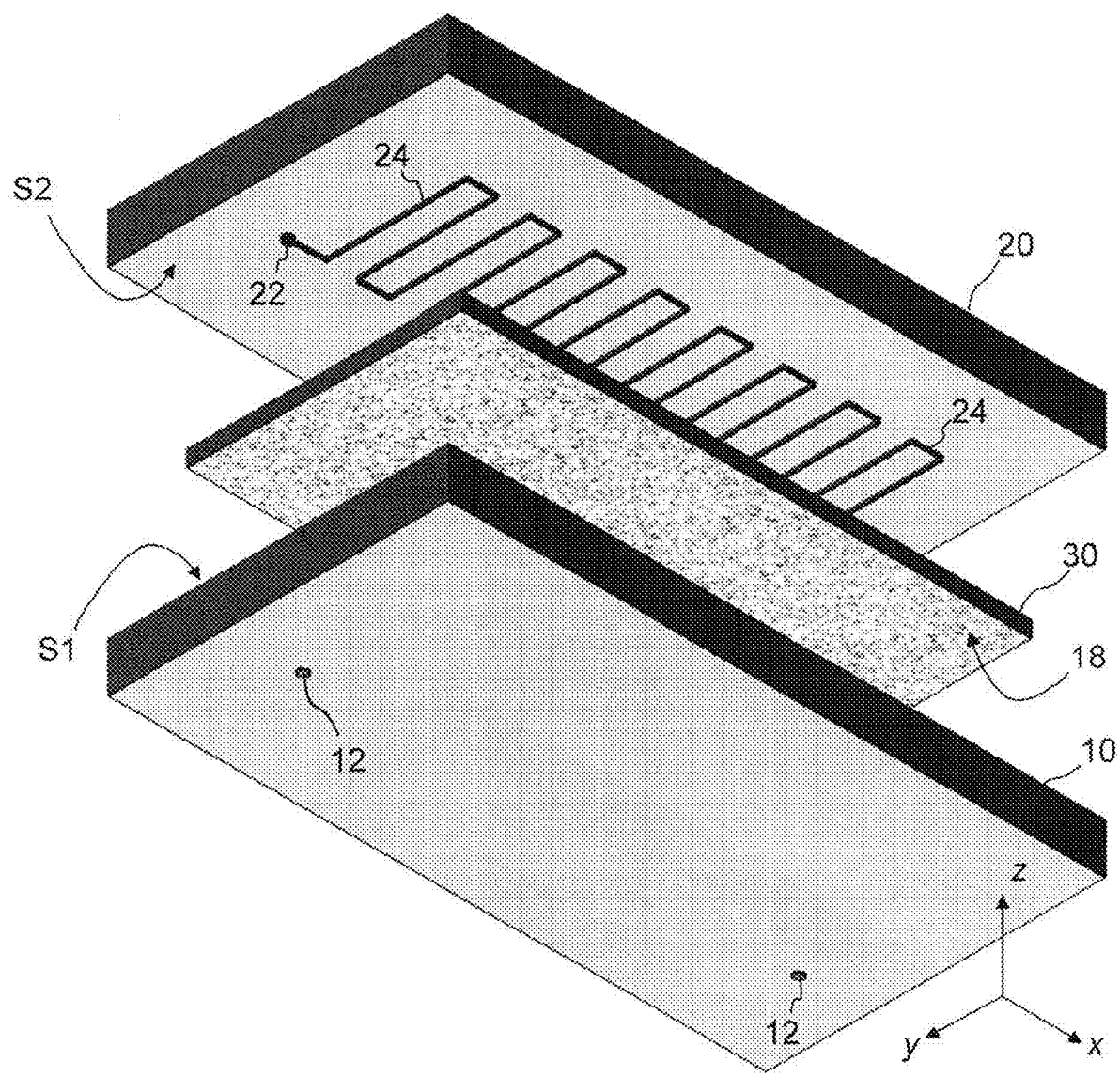
FIG. 1 is an exploded view of main components of a flow cell device according to embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

As noted in the background section, no suitable flow cell devices are available at small scale. This, as inventors have realized, is mainly due to the design of these devices and how they are assembled, as discussed now.

Redox flow cells comprise two half-cells, each equipped with one or multiple flow channels as well as an electrode material, wherein the two half-cells are separated by a membrane.

In order to achieve alignment, fluidic sealing and electrical contact, cells are equipped with bulky mechanical fixtures to achieve compression of the membrane and gaskets, which imposes substantial constraints on the total volume of a single cell. As it can be realized, removing the need for such mechanical fixtures may allow the size of the device to be substantially reduced, e.g., by one order of magnitude or more.

Redox flow cells with miniaturized designs (i.e., compatible with the form factor of a microelectronics processor) are known. However, such miniaturized designs do typically not involve a membrane, thereby causing cross-over of the two electrolyte streams, which may prevent some applications. Rather, designs relying on membranes rely on bulky mechanical clamping, which prevent the flow cell from being truly miniaturized for intimate integration with other components, e.g., for combined cooling and power delivery.

Although the above discussion focuses on redox flow cells, the same observations are valid for other types of reactors. The present inventors therefore developed a novel concept of flow cell devices, which makes it notably possible to avoid the use of bulky mechanical fixtures and therefore reduce the size of such flow cell devices.

In reference to FIGS. 1-6, an aspect of the invention is described, which concerns a flow cell device 1, 1a. The device first comprises an exchange membrane 30. The latter extends essentially in a plane and a flat form factor (such membranes are known per se). The device 1, 1a further comprises two half-cells 10, 20, each arranged on a respective side of the main plane of the membrane 30, so as for the half-cells 10, 20 to sandwich the membrane 30.

The membrane 30 spans a smaller area than the area of each of the half-cells 10, 20. Thus, a peripheral space PS remains, at the periphery of the membrane 30, i.e., between two opposing faces S1, S2 of the half-cells 10, 20. Advantageously, this space PS can be at least partly filled with an adhesive (or underfill) 50, so as to secure the two half-cells 10, 20 to each other, with the membrane 30 encapsulated therein. Once the device is assembled, the adhesive 50 (see FIG. 4 or 6) is therefore located at the periphery of the membrane 30.

This adhesive 50 makes it unnecessary to rely on bulky mechanical fixtures to maintain the mechanical configuration of the half-cells. A flow cell can thus be fabricated that does not require any external compression means. As a result, the present approach makes it possible to obtain and deploy flow cell devices at a much smaller scale than prior approaches. The volume of the resulting devices may for instance be less than 100 or 10 mm$^3$. Even, devices of 0.1 to 1 mm$^3$ may be fabricated, e.g., leveraging techniques known in microfluidics. Devices of reduced size, as discussed herein, may advantageously be used in applications such as microreactors, high-throughput screening, clinical diagnostics, or portable power sources and energy storage.

In addition, the absence of mechanical support structures enables more intimate contact of the cell 1, 1*a* with its surrounding, which favors thermal coupling to supply heat to the cell, as needed in applications.

In variants, small fixtures may be involved, if necessary, to reinforce cohesion, e.g., if the remaining space PS is not large enough to allow enough adhesive for the device to be self-supported. Yet, in all cases, the present approach allows the size of the device to be reduced, in principle.

In preferred embodiments, the peripheral space PS extends up to one or more peripheral edge surfaces Se (i.e., lateral surfaces that are perpendicular to axes x and/or y) of each of the two half-cells 10, 20. The sandwich structure may for instance be open on two or more of the lateral surfaces Se. More preferably, the sandwich structure is laterally open on each lateral surface, as assumed in the accompanying drawings, to ease the insertion of the adhesive 50. That is, the adhesive 50 may be more easily filled from the periphery of the device 1, 1*a*, thanks to the laterally open spaces PS.

In variants (not shown), one or more perpendicular vias may be provided perpendicular to one or each of the half-cells 10, 20 (along z), to allow an adhesive to be filled in the peripheral space PS, through such vias. Such variants are, however, less practical for assembling the devices.

Incidentally, the vertical (y) dimensions of the peripheral space PS may be optimized to help the adhesive to creep into the gap PS by means of capillary forces. For example, the extension of the peripheral space PS along the vertical (y) dimension may be less than 0.20 mm, or preferably less than 0.10 mm, and in the most preferred embodiments less than 0.05 mm. The extension of the peripheral space PS along the horizontal (x) dimension is less critical in terms of allowing for the capillary action of the adhesive. However, in embodiments, the horizontal (x) dimension of the peripheral space PS is typically less than 2.0 mm, and preferably 1.0 mm or less, in order to limit the amount of adhesive required for the invention. If necessary, a cavity may be formed in an inner region of the outer parts 10, 20, to partly house the membrane 30 therein and effectively decrease the vertical height of the space PS.

Next, preferred embodiments of the flow cell devices 1, 1*a* involve one or more pinning structures 16, 26, to pin the adhesive 50 in the peripheral space PS. As for instance depicted in FIGS. 2 and 6, one or each of the two half-cells 10, 20 may comprise a pinning structure 16, 26 designed so as to prevent the adhesive to penetrate too far in the membrane 30 while being filled in the peripheral space. The adhesive (e.g., comprising an epoxy resin) is still a liquid or a gel when being filled and may therefore be pinned by the pinning structure 16, 26 as it fills the peripheral spaces PS, e.g., owing to anti-wetting effects caused by the structures 16, 26.

Figure 4:
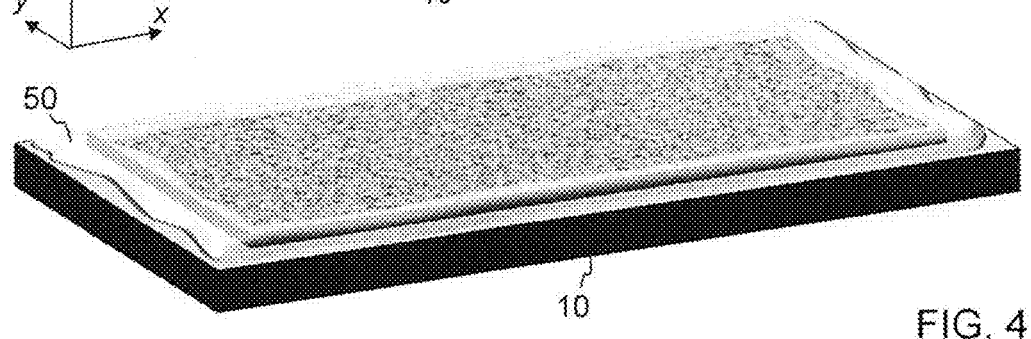
Figure 5:
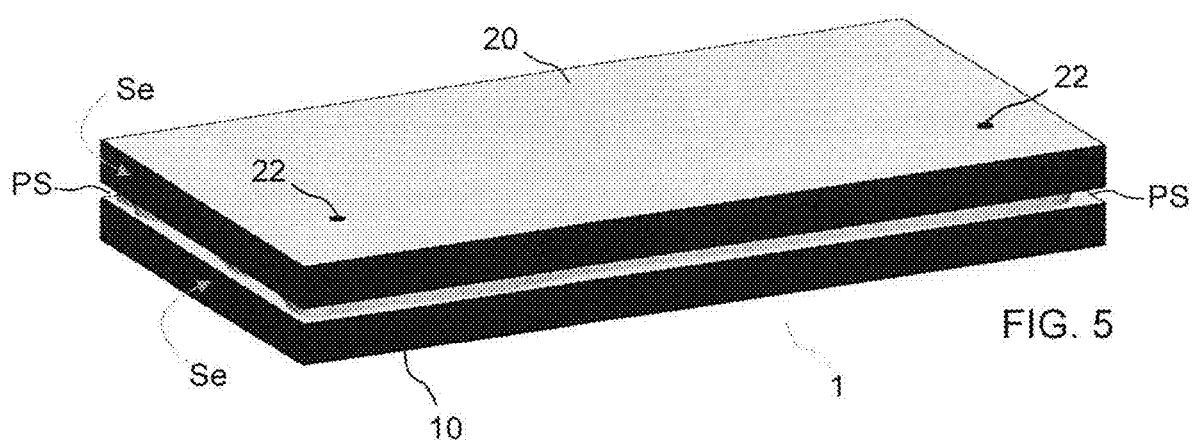
Figure 6:
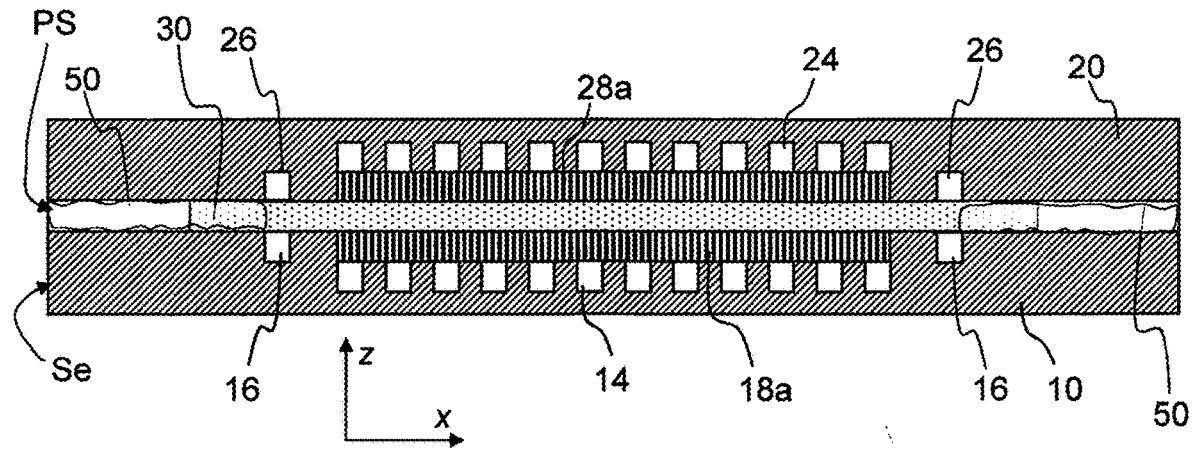
FIG. 6 is a 2D cross-sectional view of another embodiment of a flow cell device, which comprises electrodes housed in each half-cell of the device.

For instance, such pinning structures 16, 26 may be located vis-à-vis a peripheral area of the membrane 30, to allow the adhesive to slightly penetrate outer regions of the membrane. As seen in FIGS. 4, 6, the adhesive 50 may thus be partly impregnated in a peripheral portion of the membrane 30. As a result, the adhesive 50 will not only maintain the two half-cells 10, 20 but, in addition, it will fix the membrane 30 to each of the half-cells.

However, the adhesive should typically not impregnate the active, central portion of the membrane 30, e.g., the portion facing electrodes (FIG. 6) in redox flow cells, whence the advantage of using pinning structures 16, 26 suitably located vis-à-vis the membrane 30, at a periphery thereof.

In variants, the membrane 30 may be designed (material, pore density, etc.) so that the adhesive will only partly be seeped in the membrane 30, in a limited peripheral region thereof, without any pinning structures being needed. In other variants, the membrane 30 itself may comprise structural elements to block the progression of the adhesive as it is filled.

Pinning structures 16, 26 may for instance comprise one or more recesses, e.g., it may be formed as one or more grooves on the opposing faces S1, S2 of the two half-cells 10, 20, having depths that extend perpendicularly to such faces S1, S2. The depth and width of the structures 16, 26 may be adjusted so as to pin the adhesive by capillarity as the peripheral space PS is filled with the adhesive, when assembling the device 1, 1*a*. Another mechanism by which the pinning structures 16, 26 limit the progression of the underfill material during application is by providing a reservoir for excess underfill, thereby rendering the process of applying the underfill less sensitive to the total amount of underfill dispensed at the peripheral space PS. Grooved structures can be obtained by physically and/or chemically processing a substrate, e.g., a silicon wafer, so as to form grooves, i.e., cuts or depressions on each side of the substrate. The dimensions of the pinning structures along the x- and z-directions determine to what extent each of the two pinning mechanisms described above is active. For example, when the pinning structures 16, 26 extend in the x- and z-directions by less than 0.2 mm, the total volume enclosed by the pinning structures in typical embodiments is rather small and the main pinning action of the pinning structures 16, 26 is manifested by surface tension and contact angle effects. When the pinning structures extend by more than 0.2 mm, or in particular more than 1.0 mm, in the x- and z-directions, the total volume enclosed by the pinning structures 16, 26 is rather large, and therefore the pinning structures 16, 26 may act as effective reservoirs to buffer the volume of the underfill and thereby limit the propagation of the filling front of the epoxy. In this case, the pinning structures 16, 26 will act by means of the reservoir effect rather than the surface tension or contact angle effect. Both mechanisms adequately serve the purpose of the invention, and it should be understood by those skilled in the art that the dimensions of the pinning structures are chosen depending on the specific details of the device and the method of fabrication of the device, including the contact angle between the underfill and the half-cells, the accuracy with which a nominal volume of underfill can be applied to the peripheral space PS, and the time taken for the epoxy to cure in relation to the time taken for the epoxy to penetrate into the membrane 30 and gaps between the membrane 30 and the half-cells 20 and 50.

In variants, other types of pinning structures may be contemplated, such as an array of protruding features. Anti-wetting structures are known per se. In the present context, the skilled person will appreciate that the dimensions of the pinning structures 16, 26 need be adjusted to repel the adhesive 50 (and possibly the electro-chemical liquid used to operate the flow cell, as discussed later). Still, processing recesses or grooves 16, 26 on surfaces of the half-cells is perhaps the easiest option, in terms of fabrication. Also, and as assumed in the accompanying drawings, each of the two half-cells 10, 20 may comprise such recesses or grooves, to pin the adhesive 50 from each side S1, S2.

In embodiments, and thanks to the adhesive 50 filled in the peripheral space(s) PS, the two half-cells 10, 20 are solely held by the adhesive 50 and, therefore, the present devices 1, 1a do not need to involve any additional mechanical force compression means to hold the half-cells 10, 20. The absence of compression means allows devices with smaller footprint to be obtained, having volumes of, e.g., less than 100 or 10 mm$^3$.

At present, the membrane 30 and adjacent layers are discussed in detail. For instance, the membrane 30 may be coated with an electrode or catalyst material or have a functionalized surface, on each side of the membrane. Yet, the functionalization may be obtained thanks to layers provided in each of the half-cells 10, 20, parallel to (and typically in direct contact with) the membrane. In general, each of the half-cells 10, 20 may comprise a functional layer, e.g., a gas diffusion layer, an electrode material or a catalyst support layer. For example, a gas diffusion layer may be applied against the membrane, as assumed in FIG. 3. In the variant of FIG. 6, an electrode layer is provided in each half-cell, on each side of the membrane 30. The membrane itself may for example be a micro- or a nano-porous separator. The exact design depends on the intended application. For example, a redox flow cell would involve electrodes, as assumed in FIG. 6.

Figure 2:
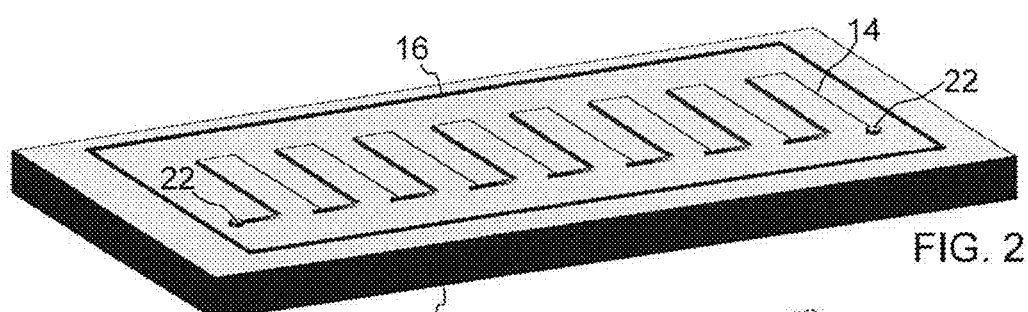
FIGS. 2-5 are 3D views of a variant to the device of FIG. 1, which further involves pinning structures.
Figure 3:
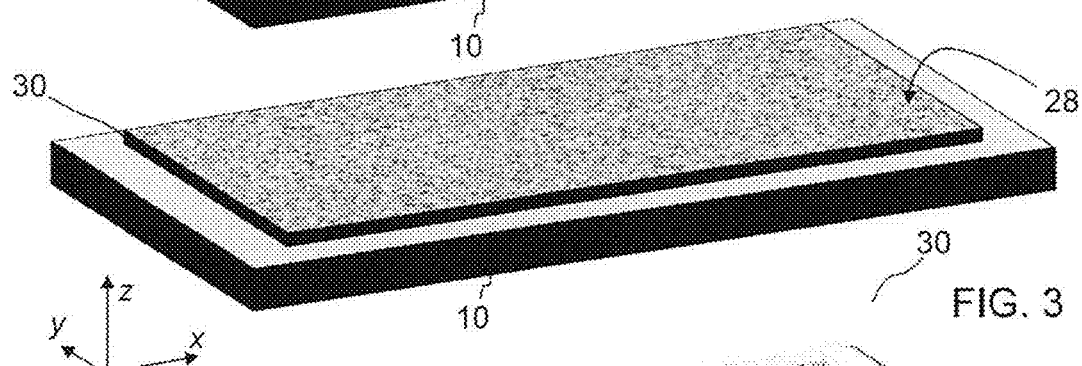

Referring now to FIGS. 1, 2, and 6: each of the half-cells 10, 20 preferably comprises a flow channel structure 14, 24 to transport fluids, e.g., electrochemical fluids. The flow channel structures 14, 24 generally extend parallel to the separation plane (which corresponds to the main plane of the membrane 30, parallel to (x, y)). Still, through-vias 12, 22 may advantageously be provided through the main bodies 10, 20 of the half-cells to provide fluid communication with the inner channels 14, 24 and allow fluids to be circulated therethrough. Tubing ports or gaskets (not shown) may be provided on the outer surfaces, to allow fluidic connections, as well as active pumping means. In variants, loading pads and/or liquid buffers (or reservoirs), may be patterned on one or each outer surface, to receive liquids, which may further be in fluid communication with the vias 12, 22, e.g., via passive capillary pumps, to allow fluid circulation. Such variants ease the integration of the cell devices. In all cases, the flow channel structures 14, 24 need be configured, together with functional layers 18, 28 (or 18a, 28a), so as to allow molecules and/or ions to diffuse from (or to) the flow channel structure 14, 24 to (or from), the membrane 30, to enable the flow cell device.

The structure 14, 24 may for instance be obtained by grooving microchannels on the half-cells' bodies (e.g., a silicon substrate or a graphite plate). Again, grooved structures can be obtained by physically and/or chemically processing the substrate.

Note that, if pinning structures 16, 26 are present and if the latter are dimensioned so as to repel or pin electrochemical liquid used to operate the flow cell 1, 1a (in addition to pinning the adhesive), then the pining structures 16, 26 need further be arranged so as to enclose the flow channel structure 14, 24 or, at least, not to intersect the latter, as assumed in FIGS. 2 and 6.

The flow channel structures 14, 24 can typically be designed small enough, so as to enable micro-sized devices. Such structures may for instance comprise channels having at least one characteristic dimension (depth and/or width) that is less than 1 mm. The pinning channels 16, 26 may have comparable dimensions or smaller as described above, but in typical embodiments not significantly smaller such that structures 14, 16, 24, 26 may all be obtained during a same processing step.

Figure 7:
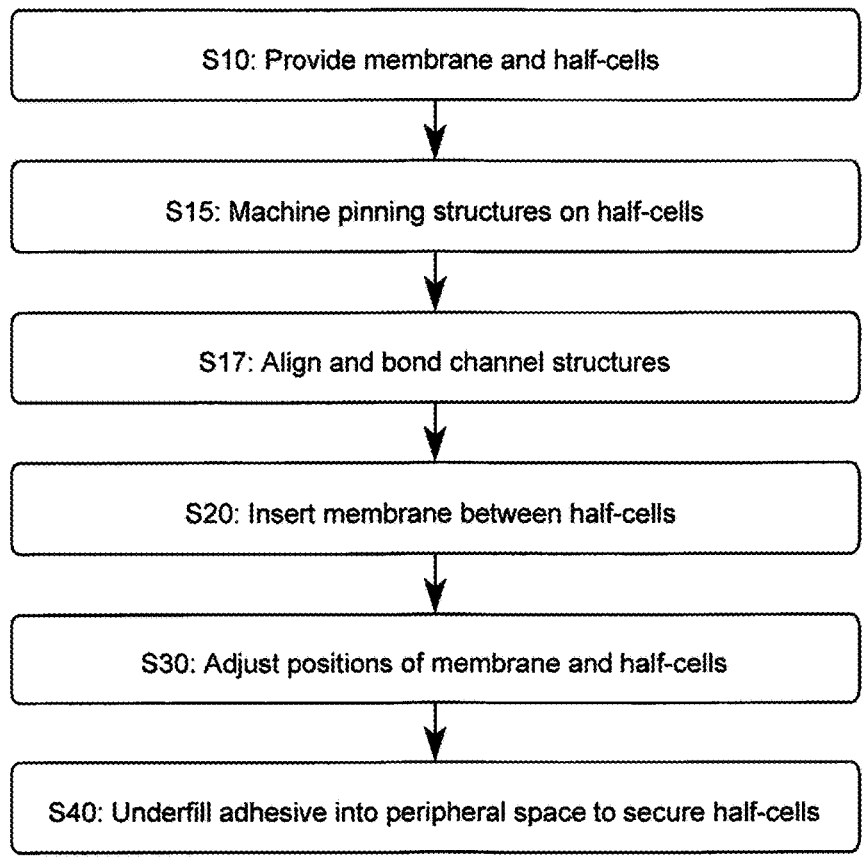
FIG. 7 is a flowchart illustrating fabrication steps of a device according to embodiments.

Referring to FIG. 7, another aspect of the invention is now described, which concerns a method of fabrication of a flow cell device 1, 1a such as described above. Basically, a membrane 30 need be inserted S20 between two half-cells 10, 20 and the latter positioned S30 so as to define a peripheral space PS, consistently with principles described earlier. Then, an adhesive 50 can be filled S40 into this peripheral space PS, so as to secure the two half-cells 10, 20 to each other with the membrane 30 encapsulated therein. If necessary, the adhesive is cured (e.g., thermally).

In embodiments such as evoked earlier, the peripheral space PS extends up to one or more lateral, peripheral edge surfaces Se of each of the two half-cells 10, 20, such that the adhesive 50 can be inserted S40 from a lateral side (or lateral sides) of the device 1, 1a.

In embodiments, the flow cell device 1, 1a comprises half-cells patterned so as to exhibit pinning structures 16, 26 and/or channels 14, 24. In that case, the method may further comprise, prior to inserting S20 the membrane 30, steps S15 of processing (e.g., chemically and/or mechanically patterning, or machining) such structures 14, 16, 24, 26 on one or each inner face S1, S2 of the half-cells 10, 20.

In variants, the flow channel structures 14, 24 may be formed on a separate substrate, which would then need be aligned and bonded or mechanically fixed to a supporting structure of (a body forming a mechanical frame for) each of the half-cells 10, 20, prior to inserting the membrane 30, as assumed in the flowchart of FIG. 7. Incidentally, devices may be contemplated, which simply rely on a mechanical press fit to contain the separate channel structures. The channel flow substrates may for instance be aligned with such supporting structures by means of alignment features, using a flip chip bonder or any other suitable technique. The membrane 30 can then be inserted between the two structures 10, 20 and the top structure 20 is landed on the membrane 30, prior to filling the adhesive 50.

A volatile solvent such as isopropanol can be dispensed onto any one or multiple ones of the layers/components 10, 18 (18a), 20, 28, (28a), 30, at any stage, in order to temporarily maintain cohesion of the sandwich structure, if necessary. The device is next completed using an underfill 50, injected from the edges Se where the two parts 10, 20 meet.

In a particularly preferred embodiment, the device 1, 1a is fabricated so as to comprise a pair of flow channel structures 14, 24, each being contiguous with an electrode material 18a, 28a, as in FIG. 6, and a membrane 30. The flow channels 14, 24 are miniaturized and micro-scale, i.e., at least one characteristic dimension thereof is smaller than 1 mm. The membrane 30 is fixed in place and encapsulated using a capillary underfill 50. After assembly, the device is mechanically self-supporting and does not require external compression to seal and function correctly. The capillary underfill 50 flows into empty cavities by capillary action. It seals around the edge of the membrane 30, but does not impregnate the active area of the membrane (between the electrodes 18a, 28a) or the electrodes themselves, which might otherwise occur as the membrane 30 (or other separator) and the electrodes can be very effective in terms of capillary action. The limited expansion of the underfill 50 is achieved by dispensing a defined amount of underfill 50, which is pinned by structures 16, 26, provided around the channel structures 14, 24.

This way, a micro redox flow cell can be fabricated with a membrane 30, without requiring external compression. Other types of flow cell devices can be obtained using a similar approach, as the skilled person will appreciate. The lack of mechanical support structures enables intimate thermal contact of cell with its surroundings, e.g., to supply heat to the cell, as needed in applications. This approach further allows the co-integration of different materials, e.g., silicon parts 10, 20 (also referred to as "flow fields") with polymer membrane 30, while typically causing same or even lower costs of fabrication compared to prior micro flow cells.

Voltage-power-current polarization curves were measured by the inventors, to check the functionality of devices obtained according to embodiments.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly cited may be contemplated.

What is claimed is:

1. A flow cell device comprising:
   an exchange membrane, extending essentially in a plane;
   an adhesive, at a periphery of the membrane; and
   two half-cells, each on a respective side of said plane, the half-cells sandwiching the membrane;
   wherein,
   the membrane spans a smaller area than each of the areas of the half-cells, whereby a peripheral space is defined at the periphery of the membrane between two opposing faces of the half-cells, which space is at least partly filled with the adhesive, the adhesive being an epoxy resin, the epoxy resin being partly impregnated in a peripheral portion of the membrane so as to secure the two half-cells to each other with the membrane encapsulated therein, the two half-cells being solely held by said epoxy resin and do not comprise any additional mechanical force compression means to hold them, wherein each said half-cell comprises:
   a main body having a flow channel structure to transport fluid; and
   at least one through-via structure to provide fluid communication with the flow channel structure to permit fluids to be circulated therethrough.

2. The flow cell device according to claim 1, wherein said peripheral space extends up to a peripheral edge surface of each of the two half-cells.

3. The flow cell device according to claim 1, wherein one or each of the two half-cells comprises a pinning structure to pin the adhesive in said peripheral space.

4. The flow cell device according to claim 3, wherein said pinning structure is located vis-à-vis a peripheral area of the membrane.

5. The flow cell device according to claim 3, wherein said pinning structure is a recess extending perpendicularly to said opposing faces.

6. The flow cell device according to claim 5, wherein each of the two half-cells comprises such a recess.

7. The flow cell device according to claim 1, wherein a volume of the device is less than 100 mm$^3$.

8. The flow cell device according to claim 1, wherein each of the half-cells comprises a layer extending parallel to the membrane, said layer being one of: a gas diffusion layer; an electrode; and a catalyst support layer.

9. The flow cell device according to claim 1, wherein the membrane is coated with a catalyst material or has a functionalized surface, on each side of said plane.

10. The flow cell device according to claim 1, wherein the membrane is a micro- or a nano-porous separator.

11. The flow cell device according to claim 8, wherein each flow channel structure extends parallel to said plane and being configured, together with said layer, so as to allow molecules and/or ions to diffuse from or to the flow channel structure to or from, respectively, the membrane.

12. The flow cell device according to claim 11, wherein each flow channel structure comprises a channel having at least one characteristic dimension that is less than 1 mm.

13. The flow cell device according to claim 1, wherein the flow cell device is a micro redox flow cell.

* * * * *